United States Patent [19]

Taylor, Jr.

[11] Patent Number: 4,496,093

[45] Date of Patent: Jan. 29, 1985

[54] APPARATUS FOR ALIGNING ABUTTING PIPES

[76] Inventor: Julius E. Taylor, Jr., P.O. Box 721, Rte. 2, Guntersville, Ala. 35976

[21] Appl. No.: 501,122

[22] Filed: Jun. 6, 1983

[51] Int. Cl.³ .............................................. B23K 37/09
[52] U.S. Cl. ................................. 228/49 B; 228/44.5; 269/43; 269/48.1
[58] Field of Search ............... 228/49 B, 44.5; 269/43, 269/48.1; 81/444, 445; 29/272, 255, 281.5, 281.6

[56] References Cited

U.S. PATENT DOCUMENTS

| 2,791,206 | 4/1956 | Stevenson | 269/48.1 |
| 2,821,996 | 2/1958 | Goekler | 269/48.1 |
| 3,330,021 | 7/1967 | Jacobsen | 269/48.1 |
| 3,684,149 | 8/1972 | Ambler | 228/49 B |
| 3,960,311 | 6/1976 | Griffiths | 228/49 B |

Primary Examiner—Kenneth J. Ramsey
Assistant Examiner—C. McKee
Attorney, Agent, or Firm—Woodford R. Thompson, Jr.

[57] ABSTRACT

Abutting ends of pipes are aligned by apparatus embodying a body having a threaded opening therein extending axially of the abutting pipes. A threaded actuator member engages the threaded opening and has a conical end defining a cam surface. A radially extending extendible member is carried by the body with its outer end in position to engage the inner surfaces of the abutting pipes and with its inner end extending inwardly of the opening in the body and having a cam surface positioned to engage the cam surface on the actuator member. Radially extending fixed members are secured to the body in angularly spaced relation to each other and to the extendible member with the distance from the center line of the body to the outer ends of the fixed members being equal the radius of the abutting pipes. An operator rotates the actuator member in one direction to move it axially of the abutting pipes to engage its cam surface on the extendible member to thus move the extendible member radially toward the inner surfaces of the abutting pipes and in an opposite direction to release the extendible member.

10 Claims, 7 Drawing Figures

U.S. Patent   Jan. 29, 1985   Sheet 1 of 2   4,496,093
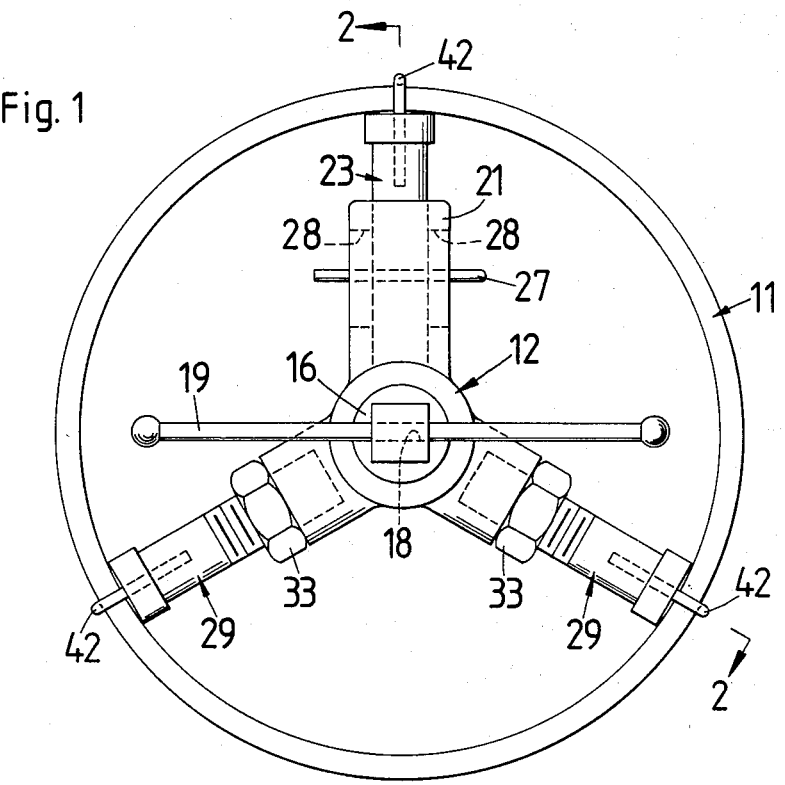
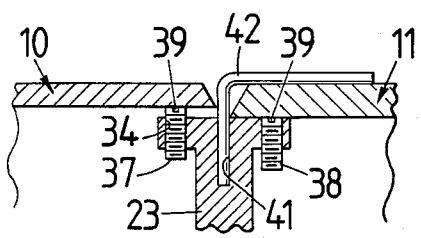
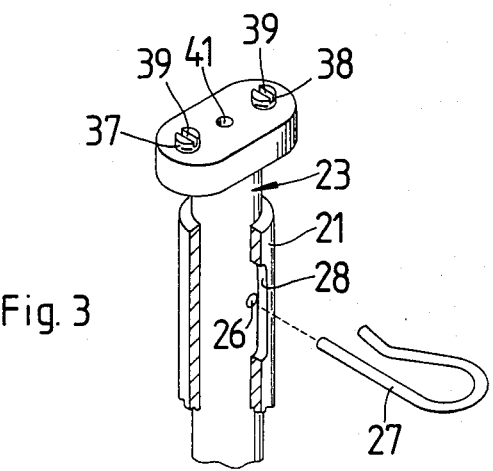
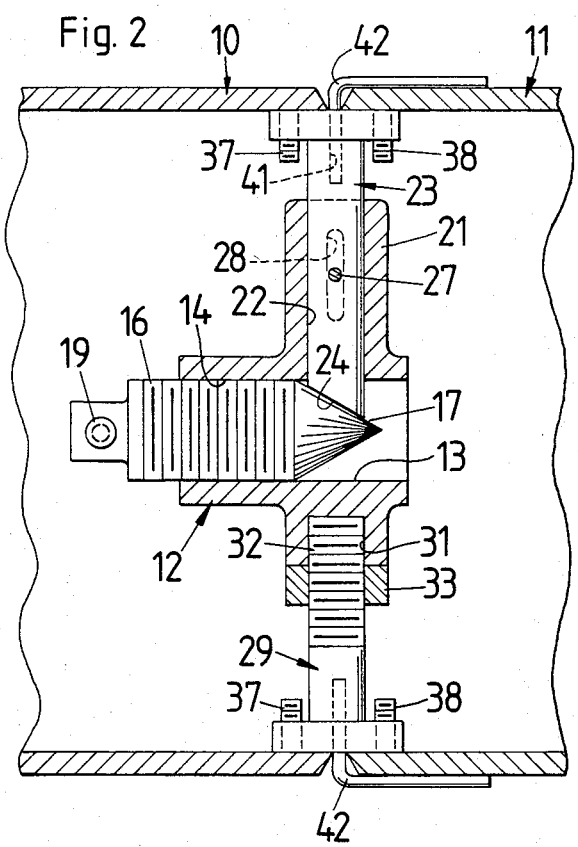

4,496,093

APPARATUS FOR ALIGNING ABUTTING PIPES

BACKGROUND OF THE INVENTION

This invention relates to apparatus for aligning abutting pipes and more particularly to such apparatus which is adapted to accurately align the inside surfaces of pipe-like members, such as pipes, fittings and the like, for the purpose of making open butt welds and the like. Throughout the specification and claims, the use of the word "pipe" is intended to include pipes, fittings and similar tubular members.

Heretofore in the art to which my invention relates, difficulties have been encountered in aligning the internal surfaces of abutting pipes with the necessary accuracy required in the installation of pipes, fittings and the like in certain installations, such as in nuclear plants and the like. That is, before making open butt welds in such installations, the abutting pipes must be accurately aligned to meet very strict specifications. Accordingly, where open butt welds are made in such installations without properly aligning the abutting pipes, not only is there a great loss in the replacement of expensive stainless steel pipe sections but there is also a considerable loss in the man hours required to replace such improperly installed pipes and fittings.

While various types of internal pipe alignment clamps have been proposed, such clamps have embodied complicated and expensive mechanisms which are very difficult to insert into and remove from the abutting pipe sections being joined by welding. For example, the Looney U.S. Pat. No. 3,633,813 discloses an internal pipe line-up clamp which includes complicated mechanisms for aligning adjacent sections of pipe. Also, the Adams et al. U.S. Pat. No. 3,615,413 and the Jacobsen U.S. Pat. No. 3,330,021 both disclose internal pipe aligning tools wherein scissors-lke elements are employed to align the inner surfaces of adjacent pipes. Such prior art tools for aligning pipes are not only complicated in structure and expensive to manufacture but they are also difficult to insert into and remove from the pipes being aligned.

SUMMARY OF THE INVENTION

In accordance with my invention, I overcome the above and other difficulties by providing apparatus for aligning abutting pipes which is extremely simple of construction, economical of manufacture and one which may be easily operated by unskilled labor to accurately align the inner surfaces of abutting pipes for the purpose of making open butt welds and the like.

An object of my invention is to provide apparatus for aligning the inner surfaces of abutting pipes which assures positive alignment of adjacent pipe sections so that an efficient and accurate welding operation may be accomplished.

My improved apparatus for aligning the inner surfaces of abutting pipes comprises a body having a threaded opening therein adapted to extend axially of the abutting pipes with at least a portion of the opening being threaded for receiving an elongated, threaded actuator member. One end of the actuator member is conical in shape to provide a tapered cam surface in position to engage a cam surface carried by the inner end of a radially extending extendible member carried by the body. The outer portion of the extendible member is in position to engage the internal surfaces of the abutting pipes. At least two radially extending, fixed members are secured to the body in angularly spaced relation to each other and to the radially extending extendible member with the angular distance between adjacent radially extending members being substantially equal. Also, the distance from the center line of the body to the outer end of each radially extending fixed member is equal the radius of the inner surfaces of the abutting pipes. Means is provided to rotate the actuator member in one direction to move it axially of the abutting pipes so that its tapered cam surface engages the cam surface on the extendible member and moves it radially and outwardly toward the internal surfaces of the abutting pipes. Upon rotation of the actuator member in the opposite direction, the extendible member is released for radial movement inwardly of the internal surfaces of the abutting pipes, thus permitting easy removal of the apparatus.

DESCRIPTION OF THE DRAWINGS

Apparatus embodying features of my invention is shown in the accompanying drawings, forming a part of this application, in which:

FIG. 1 is an end elevational view showing my improved apparatus in place within abutting pipe sections;

FIG. 2 is a sectional view taken generally along the line 2—2 of FIG. 1;

FIG. 3 is a fragmental view, partly in section, showing the manner in which the radially extending extendible member is supported for movement relative to the body member;

FIG. 4 is a fragmental, sectional view showing adjustable means carried by the outer ends of the radially extending members in position to engage the internal surfaces of abutting pipes to compensate for any differences in the inside diameters of the abutting pipes;

DETAILED DESCRIPTION

Figure 5:
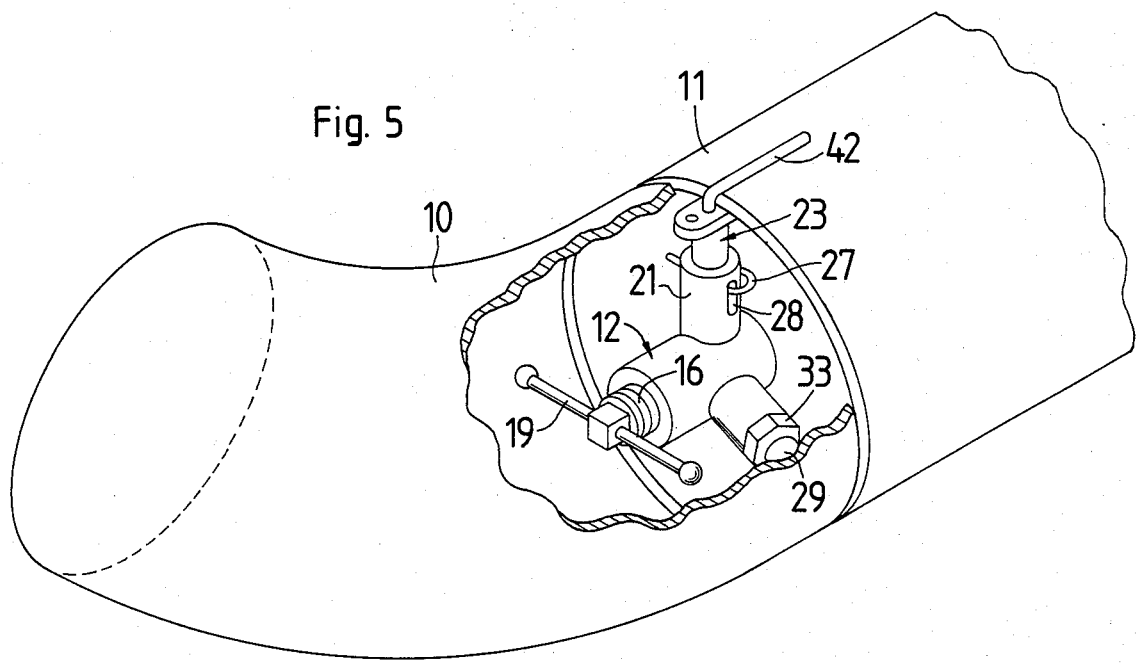
FIG. 5 is a perspective view drawn to a smaller scale and partly broken away and in section to show the manner in which my improved apparatus is mounted within abutting pipes.

Referring now to the drawings for a better understanding of my invention, I show in FIGS. 1, 2 and 5 abutting pipes 10 and 11 with the internal surfaces thereof aligned for the purpose of making an open butt weld therebetween. As shown in FIG. 2, the ends of the abutting pipes 10 and 11 are beveled in the usual manner.

My improved apparatus for aligning abutting pipes embodies a body member 12 having an elongated opening 13 therein which is adapted to extend axially of the abutting pipes 10 and 11, as shown in FIGS. 2 and 5. At least a portion of the opening 13 is threaded as at 14 for receiving an elongated externally threaded actuator 16 having a conical end which defines a tapered cam surface 17, as shown in FIG. 2. The other end of the actuator 16 is provided with a transverse opening 18 therethrough for receiving a handle or operator 19 which is employed to rotate the actuator 16 in opposite directions whereby it moves axially of the opening 13 and the pipes 10 and 11.

The body member 12 is provided with a radially extending tubular member 21 having a radially extending opening 22 therethrough which communicates with and extends perpendicular to the opening 13, as shown in FIG. 2. Mounted for sliding movement in the radially extending opening 22 is a radially extending, extendible member 23 which is adapted to move toward and away from the internal surfaces of the abutting pipes 10 and 11. The inner portion of the extendible member 23 extends inwardly of the opening 13 in the body member 12 and has a cam surface 24 on its inner end which extends generally parallel to and engages the tapered cam surface 17 on the actuator 16, as shown in FIG. 2. To permit sliding movement of the enlongated extendible member 23 within the radially extending opening 22, a transverse opening 26 is provided in the extendible member 23 for receiving a pinlike element 27 which rides in elongated openings 28 provided in the radially extending member 21, as shown in FIGS. 1, 2 and 3. The elongated openings 28 extend in the direction of movement of the extendible member 23 to thus permit limited movement of the extendible member 23 relative to the body member 12.

As clearly shown in FIGS. 1 and 2, I show two radially extending, fixed members 29 which are secured to the body 12 in angularly spaced relation to each other and to the radially extending, extendible member 23 with the angular distances between adjacent radially extending members being substantially equal. The distance from the center line of the body member 12 to the outer ends of each radially extending, fixed member 29 is equal the radius of the inner surfaces of the abutting pipes 10 and 11. As shown in FIG. 2, an adjustable connection secures each of the radially extending, fixed members 29 to the body member 12 so that the effective length of each of the fixed members may be varied prior to being fixed to the body member 12. Each adjustable connection for the radially extending fixed members 29 comprises a radially extending threaded opening 31 in the body member 12 which receives an externally threaded inner end portion 32 on each of the radially extending, fixed members 29. A lock nut 33 is carried by the threaded inner end portion 32 in position to engage the adjacent portion of the body member 12 to thus secure each radially extending fixed member 29 in place whereby the distance from the center line of the body member 12 to the outer end of each radially extending fixed member 29 is equal to the radius of the inner surfaces of the abutting pipes 10 and 11 to be joined by welding.

The outer portion of each of the radially extending, fixed members 29 and the outer portion of the radially extending, extendible member 23 is provided with spaced apart threaded openings 34 therein which are adapted to extend radially of the abutting pipes 10 and 11 and in axially spaced relation to each other. Externally threaded adjustable members 37 and 38 are in threaded engagement with the threaded openings 34 in position for the adjustable member 37 to engage the inner surface of the pipe 10 while the other adjustable member 38 engages the inner surface of the pipe 11 to thus compensate for any difference in the inside diameters of the abutting pipes 10 and 11, as clearly shown in FIG. 4. Preferably, each of the adjustable members 37 and 38 are in the form of a screw-like members having a tool receiving recess 39 in one end thereof, as shown.

As shown in FIGS. 2, 3 and 4, the outer portion of each of the radially extending members 23 and 29 are enlarged in an axial direction relative to the abutting pipes 10 and 11 so that the adjustable members 37 and 38 engage the inner surfaces of the pipes 10 and 11, respectively. An outwardly opening recess 41 is provided in the outer end of each of the radially extending members 23 and 29 in position to lie between the abutting ends of the pipes 10 and 11 for receiving a conventional spacer member 42 which extends inwardly between the abutting pipes 10 and 11, as clearly shown in FIGS. 2 and 4. Since all of the radially extending members 23 and 29 have recesses 41 for receiving the spacer members 42, all adjacent surfaces of the abutting pipes 10 and 11 are spaced equal distances from each other.

From the foregoing description, the operation of my improved apparatus shown in FIGS. 1–5 will be readily understood. The operator first checks the internal diameters of the two pipes to be fitted together to determine whether or not there is any difference in the inside diameters of the abutting pipes. The two radially extending fixed members 29 are then adjusted, if necessary, by loosening the lock nuts 33 and then rotating the radially extending member 29 whereby the distance from the center line of the body member 12 to the outer end of each radially extending member 29 is exactly equal the radius of the abutting pipes 10 and 11, as shown in FIG. 2. In the event one pipe, such as pipe 10, has an internal diameter greater than the internal diameter of pipe 11, the radially extending members 29 would be secured in a fixed position whereby the effective lengths thereof would be equal the radius of the pipe 11. The threaded adjustable member 37 is then rotated in a direction to move it radially outwardly whereby the distance from the outer end of the adjustable member 37 to the center line of the body member 12 is equal the radius of the pipe 10. In like manner, in the event the internal diameter of the pipe 11 is larger than the internal diameter of the abutting pipe 10, the radially extending members 29 would be secured in a fixed position whereby the effective lengths thereof would be equal the radius of the pipe 10. The adjustable member 38 would then be rotated to move it outwardly to compensate for the difference in the inside diameters of the abutting pipes 10 and 11. After proper adjustment of the radially extending members 29 relative to the body member 12, the radially extending members 29 are secured in place by the lock nuts 33.

After adjustment of the radially extending, fixed members 29, as described above, the apparatus is inserted into the abutting pipes 10 and 11 whereby the outer ends of the radially extending members 23 and 29 extend across the gap between the abutting pipes 10 and 11, as shown. It will be understood that prior to insertion of the apparatus into the abutting pipes, the actuator member 16 is rotated in a direction to move it away from the cam surface 24 carried by the radially extending, extendible member 23. That is, the actuator member 16 is moved toward the left, as viewed in FIG. 2. After insertion of the apparatus into the pipes 10 and 11, the actuator member 16 is rotated in the opposite direction to move it toward the right, as viewed in FIG. 2, whereby its cam surface 17 engages the cam surface 24 to thus move the radially extending, extendible member 23 outwardly into engagement with the inner surfaces of the pipes 10 and 11. In the drawings, I show the angular distance between the radially extending, extendible member 23 and the adjacent radially extending fixed members 29 as being 120°. Also, the angular distance between the radially extending members 29 is 120° whereby equal angular distances are provided between adjacent radially extending members. After the radially extending, extendible member 23 is forced outwardly into contact with the internal surfaces of the pipes 10 and 11, the spacer members 42 are inserted into the openings 41 in the ends of the radially extending members, as described above. The actuator member 16 is then turned again to move its cam surface 17 further toward the right whereby the radially extending, extendible member 23 is moved into firm engagement with the inner surfaces of the pipes 10 and 11 so that the center lines of the pipes 10 and 11 being fitted are now in perfect alignment.

Figure 7:
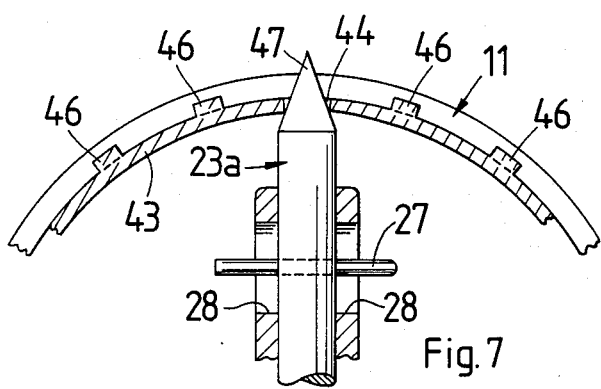
Figure 6:
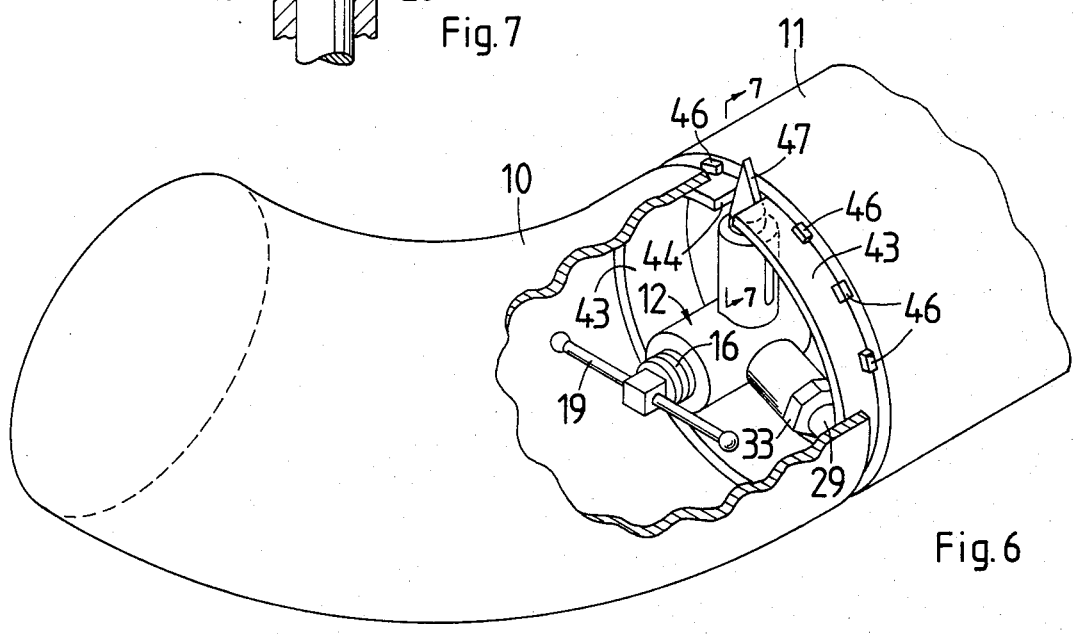
FIG. 6 is a perspective view, partly broken away and in section, showing a modified form of my invention wherein the internal surfaces of the abutting pipes are defined by a backing ring having a transverse split therein; and, FIG. 7 is an enlarged, fragmental, sectional view taken generally along the line 7—7 of FIG. 6.

In FIGS. 6 and 7, I show a modified form of my invention in which the internal surfaces of the abutting pipes 10 and 11 are defined by a backing ring 43 having a transverse split 44 therein. The backing ring is mounted within and overlaps the abutting pipes 10 and 11, as shown in FIG. 6. Preferably, outwardly projecting, angularly spaced spacer elements 46 are carried by the outer surface of the backing ring 43 in position to move between the adjacent ends of the abutting pipes, as shown. Accordingly, the spacer elements are carried by the backing ring 43, thus eliminating the necessity of having to insert the usual spacer members 42 described above.

The outer portion of the radially extending, extendible member for the embodiment shown in FIGS. 6 and 7 is indicated at 23$^a$. A transverse pin-like member 27 extends through the extendible member 23$^a$ and rides in elongated slots 28 carried by the member 21, as described above. The outer portion of the radially extending extendible member 23$^a$ is provided with a tapered point 47 of a size to enter the transverse split 44 in the backing ring 43 and thus urge the backing ring into firm engagement with the inner surfaces of the abutting pipes 10 and 11. The tapered point 47 at the outer end of the radially extending, extendible member 23$^a$ thus forces the extendible member 23$^a$ into firm engagement with the backing ring 43 which defines inner surfaces of the abutting pipes 10 and 11. It will be noted that the tapered point 47 is of a thickness equal substantially the thickness of the spacer elements 46 whereby it moves upwardly and outwardly between the abutting ends of the pipes 10 and 11.

In the event the welds are to be made with a backing ring 43 instead of an open butt weld, the same procedures are followed as set forth above except that the tapered point 47 is used instead of the radially extending, extendible member 23 shown in FIGS. 1–5.

From the foregoing, it will be seen that I have devised an improved apparatus for aligning abutting pipes, fittings and the like. By providing a radially extending, extendible member and at least two radially extending fixed members extending from the body member with the distance from the center line of the body to the outer ends of the radially extending fixed members being equal the radius of the inner surfaces of the abutting pipes, the abutting pipes being welded are maintained on the same center line. Also, by providing means for varying the effective length of the radially extending fixed members, my apparatus is adapted for use with pipes, fittings and the like of different sizes. Furthermore, by providing separate adjustable means at the outer ends of all of the radially extending members which permits independent adjustment of the effective length of each radially extending member relative to each of the abutting pipes, the center lines of the abutting pipes are maintained in accurate alignment with each other where the internal diameters of the abutting pipes are different. Furthermore by providing apparatus which includes an actuator member which moves axially of the abutting pipes to force the radially extending, extendible member into engagement with the internal surfaces of the abutting pipes, my improved apparatus may be easily positioned within the abutting pipes for alignment thereof and then easily removed by merely moving the actuator member in the opposite direction.

While I have shown my invention in two forms, it will be obvious to those skilled in the art that it is not so limited, but is susceptible of various other changes and modifications without departing from the spirit thereof.

What I claim is:

1. Apparatus for aligning abutting pipes comprising:
   (a) a body having an elongated opening therein adapted to extend axially of said abutting pipes with at least a portion of said opening being threaded,
   (b) an elongated externally threaded actuator member in threaded engagement with the threaded portion of said opening and having a conical end defining a tapered cam surface,
   (c) a radially extending extendible member carried by said body with the outer portion thereof in position to engage the internal surfaces of said abutting pipes and the inner portion thereof extending inwardly of said opening in said body and having a cam surface on its inner end in position to engage said tapered cam surface on said actuator member,
   (d) at least two radially extending fixed members secured to said body in angularly spaced relation to each other and to said radially extending extendible member with the angle between adjacent radially extending members being substantially equal and the distance from the center line of said body to the outer end of each said radially extending fixed member being equal the radius of the inner surface of said abutting pipes, and (e) means to rotate said actuator member in one direction to move it axially of said abutting pipes so that its tapered cam surface engages said cam surface on said extendible member and moves it radially and outwardly toward said internal surfaces of said abutting pipes and in an opposite direction to release said extendible member for radial movement inwardly of said internal surfaces of said abutting pipes.

2. Apparatus for aligning abutting pipes as defined in claim 1 in which said body is provided with a radially extending opening therein which communicates with and extends perpendicular to said opening extending axially to said abutting pipes and said radially extending extendible member is mounted for sliding movement in said radially extending opening toward and away from said internal surface of said abutting pipes.

3. Apparatus for aligning abutting pipes as defined in claim 2 in which said radially extending extendible member is an elongated member having a transverse opening therethrough in alignment with a transverse opening through said body with at least one of said transverse openings being elongated in the direction of movement of said extendible member and a retainer element extends through said transverse openings to permit limited movement of said extendible member relative to said body.

4. Apparatus for aligning abutting pipes as defined in claim 1 in which an adjustable connection secures each said radially extending fixed members to said body so that the effective length of each said fixed member may be varied prior to being fixed to said body.

5. Apparatus for aligning abutting pipes as defined in claim 4 in which each said adjustable connection comprises a radially extending threaded opening in said body for receiving an externally threaded inner end portion on each said radially extending fixed member, and a lock nut carried by said threaded inner end portion adapted to engage said body.

6. Apparatus for aligning abutting pipes as defined in claim 1 in which the outer end portion of each said fixed member and the outer end portion of said radially extending extendible member is each provided with spaced apart threaded openings therein which are adapted to extend radially of said abutting pipes and in axially spaced relation to each other and an externally threaded adjustable member is in threaded engagement with each said spaced apart threaded opening in position for one adjustable member to engage the inner surface of one of said abutting pipes and for the other adjustable member to engage the inner surface of the other of said abutting pipes to compensate for any differences in the inside diameters of said abutting pipes.

7. Apparatus for aligning abutting pipes as defined in claim 6 in which each said adjustable member is an elongated threaded member having a tool receiving recess in one end thereof.

8. Apparatus for aligning abutting pipes as defined in claim 6 in which an outwardly opening recess is provided in the outer end portion of each said fixed member and said extendible member for receiving a spacer member which extends between said abutting pipes.

9. Apparatus for aligning abutting pipes as defined in claim 1 in which the internal surfaces of said abutting pipes are defined by a backing ring having a transverse split therein and mounted within and overlapping said abutting pipes and said outer end portion of said radially extending extendible member is provided with a tapered point of a size to enter said transverse split in said backing ring and urge said ring into engagement with said abutting pipe.

10. Apparatus for aligning abutting pipes as defined in claim 9 in which outwardly projecting, angularly spaced spacer elements are carried by the outer surface of said backing ring in position to move between the adjacent ends of said abutting pipes.

* * * * *